US007432469B2

(12) United States Patent
Nakahama et al.

(10) Patent No.: US 7,432,469 B2
(45) Date of Patent: Oct. 7, 2008

(54) ARC SPRAYING TORCH HEAD

(75) Inventors: Shuhei Nakahama, deceased, late of Chiba (JP); by Kazuko Nakahama, legal representative, Chiba (JP); Toru Ishido, Kanagawa (JP); Masaru Takahashi, Kanagawa (JP); Reiyasu Uotani, Shiga (JP)

(73) Assignee: Ebara Corportion, Tokyo (JP)

( * ) Notice: Subject to any disclaimer, the term of this patent is extended or adjusted under 35 U.S.C. 154(b) by 275 days.

(21) Appl. No.: 10/512,160

(22) PCT Filed: Apr. 24, 2003

(86) PCT No.: PCT/JP03/05271

§ 371 (c)(1),
(2), (4) Date: Nov. 30, 2005

(87) PCT Pub. No.: WO03/090936

PCT Pub. Date: Nov. 6, 2003

(65) Prior Publication Data

US 2006/0289391 A1 Dec. 28, 2006

(30) Foreign Application Priority Data

Apr. 24, 2002 (JP) ............................ 2002-122575

(51) Int. Cl.
*B23K 10/00* (2006.01)

(52) U.S. Cl. ............................ 219/121.48; 219/121.47; 219/76.16; 219/76.15

(58) Field of Classification Search ............ 219/121.47, 219/76.15, 76.16, 121.48, 121.52, 121.45, 219/121.37, 74, 75
See application file for complete search history.

(56) References Cited

U.S. PATENT DOCUMENTS 3,901,441 A 8/1975 Kasagi (Continued)

FOREIGN PATENT DOCUMENTS

CN 86100836 A 2/1988

(Continued)

OTHER PUBLICATIONS

Chinese Office Action dated Nov. 17, 2006; Application No. 038125544.

(Continued)

*Primary Examiner*—Mark H Paschall
(74) *Attorney, Agent, or Firm*—Westerman, Hattori, Daniels & Adrian, LLP.

(57) ABSTRACT

The invention provides an arc spraying torch head including: a pair of spray material guides attached to a head body so as to face forward and guiding a flexible wire-like spray material inserted therein; a main air nozzle attached to the head body, and jetting main air toward a melting area of the spray material; the head body being provided with an auxiliary air nozzle which jets auxiliary air toward the melting area; the direction of jetted auxiliary air by the auxiliary air nozzle is tilted with respect to the direction of jetted main air by the main air nozzle, the auxiliary air being jetted toward the melting area; and a spray direction of the spray material being inclined with respect to the direction of the jetted main air.

7 Claims, 6 Drawing Sheets

U.S. PATENT DOCUMENTS

| | | | | | |
|---|---|---|---|---|---|
| 4,668,852 | A | * | 5/1987 | Fox et al. | 219/76.14 |
| 4,853,513 | A | * | 8/1989 | Fuimefreddo | 219/76.14 |
| 5,014,916 | A | | 5/1991 | Trapani et al. | |
| 5,191,186 | A | * | 3/1993 | Crapo et al. | 219/76.16 |
| 5,468,295 | A | | 11/1995 | Marantz et al. | |
| 5,964,405 | A | * | 10/1999 | Benary et al. | 239/84 |
| 6,005,215 | A | * | 12/1999 | Boyd et al. | 219/76.14 |
| 6,465,052 | B1 | * | 10/2002 | Wu | 427/540 |
| 6,663,013 | B1 | * | 12/2003 | Vanden Heuvel et al. | 239/83 |
| 6,742,719 | B2 | * | 6/2004 | Tudor et al. | 239/79 |
| 2004/0200207 | A1 | | 10/2004 | McKelvey et al. | |

FOREIGN PATENT DOCUMENTS

| | | | |
|---|---|---|---|
| CN | 1058552 | A | 2/1992 |
| CN | 2116534 | U | 9/1992 |
| CN | 2190528 | Y | 3/1995 |
| CN | 2192391 | Y | 3/1995 |
| DE | 41 08 787 | A1 | 9/1991 |
| JP | 50-40432 | | 4/1975 |
| JP | 50-51038 | | 5/1975 |
| JP | 1-13035 | | 1/1987 |
| JP | 1-273989 | | 11/1989 |
| JP | 4-227878 | | 8/1992 |
| WO | WO 03/062617 | A1 | 7/2003 |

OTHER PUBLICATIONS

German Office Action dated Feb. 7, 2006.

Notice of Reason for Rejection, dated Jun. 11, 2007, Application No. 2002-122575.

* cited by examiner

ARC SPRAYING TORCH HEAD

TECHNICAL FIELD

The present invention relates to an arc spraying torch head, and more particularly to an arc spraying torch head that is attached to a tip of a long stem in a tilted manner, jets main air on a melting area of a spray material, and jets auxiliary air in a tilted manner with respect to a jet direction of the main air or substantially perpendicularly to the jet direction, thus allowing spraying on a spot where it is hard to spray.

BACKGROUND ART

Arc spraying torches have been used in order to melt a spray material having wear resistance or other properties by an electric discharge arc, spray the molten spray material on a surface of a metal as a substrate for deposition, and improve wear resistance and other properties of the metal. Such an arc spraying torch is configured such that a pair of wire-like or bar-like flexible spray materials are guided by a pair of spray material guides to bring tips of the spray materials close together in a melting area to cause an arc between the tips and melt the spray materials by the arc, and the molten spray materials are jetted on the metal surface by an air jet for deposition. The arc spraying torch includes a spraying head having a head at one end of a long stem and an operation unit at the other end, and allows spraying on a spot where it is impossible to spray by other melting spraying methods.

As shown in FIGS. 1 to 3, a conventional arc spraying torch having a long stem includes an operation unit c attached to one end (a right end in FIG. 1) of a stem b of an arc spraying torch a, and a head d attached to the other end. The head d includes a pair of spray material guides f attached to a front wall of a head body e so as to protrude forward, and a nozzle g that is attached between the spray material guides f so as to protrude forward from the front wall and jet forward jet air, a pair of wire-like spray materials m having been taken in from a rear portion of the operation unit c, and fed by a feed mechanism in the head through the stem are inserted into corresponding spray material guides and fed out from the tips thereof; the spray materials are energized via an unshown energized electrode for discharge between the tips of the spray materials, molten by a discharge arc and then deposited on a desired metal surface by the jet air.

Another conventional arc spraying torch having a long stem includes a stem and a head aligned with each other as the above described example, and as shown in FIG. 4, a nozzle j of the head h is attached to a head body 1 away from a surface including a pair of spray material guides k (on an upper side in FIG. 4), and a molten spray material is sprayed longitudinally of the stem, thus substantially perpendicularly to an axis of the head for deposition.

However, in the former conventional arc spraying torch, a jet direction of the jet air from the nozzle g is the same as an axial direction of the stem b, and for example, the jet direction of the spray material is tilted and slightly angled with respect to a surface to be sprayed, that is, a work surface in a narrow spot where it is hard to externally spray such as an inside of a passage of a Francis turbine runner, thus the spray material cannot be appropriately deposited on the work surface. In the latter conventional arc spraying torch, the air is applied perpendicularly to a feeding direction of the spray material, and thus there are problems in quality such as a low acceleration speed of particles of the molten spray material, uneven sizes of the particles, resultant low adhesion of a film to a substrate, weak bonding between the particles, lack of density of the film, and high porosity. The film n of the spray material deposited on the substrate p may be thicker on one side as shown in FIG. 5.

These conventional arc spraying torches have to be actually used as an arc spraying method for an inner surface at the expense of the quality of the film, therefore, an improved arc spraying torch is desired.

DISCLOSURE OF THE INVENTION

An object of the invention is to provide an arc spraying torch head that can jet a molten spray material at an appropriate jet angle even on a narrow and deep work surface for deposition.

Another object of the invention is to provide an arc spraying torch head that can jet at an appropriate angle on a work surface by tilting a jet direction of a spray material with respect to an axis of a long stem of an arc spraying torch.

A further object of the invention is to provide an arc spraying torch head that can jet a molten spray material at high speed by main air and auxiliary air, and can adjust a jet direction by adjusting a pressure of the auxiliary air.

The invention provides an arc spraying torch head including: a pair of spray material guides attached to a head body so as to face forward and guiding a flexible wire-like spray material inserted therein; a main air nozzle attached to the head body, and jetting main air toward a melting area of the spray material; the head body being provided with an auxiliary air nozzle which jets auxiliary air toward the melting area; the direction of jetted auxiliary air by the auxiliary air nozzle is tilted with respect to the direction of jetted main air by the main air nozzle, the auxiliary air being jetted toward the melting area; and a spray direction of the spray material being inclined with respect to the direction of the jetted main air.

In the arc spraying torch head, the head body may be attached to a tip of a stem of an axially extending arc spraying torch such that the jet direction of the main air is tilted at a desired angle with respect to an axis of the stem. In the arc spraying torch head, the pair of spray material guides, the main air nozzle, and the auxiliary air nozzle may be attached to a front wall of the head body so as to protrude forward, and at least an outlet of the pair of spray material guides may be tilted with respect to the direction of the jetted main air so as to direct to the melting area. In this case, the auxiliary air nozzle may be disposed in a plane substantially perpendicular to a plane in which the pair of spray material guides are disposed and passing through a center of the main air nozzle, and the direction of the jetted auxiliary air by the auxiliary air nozzle may be directed toward the melting area.

The invention provides an arc spraying torch head including: a pair of spray material guides attached to a head body so as to face forward and guiding a flexible wire-like spray material inserted therein; a main air nozzle attached to the head body and jetting main air toward a melting area of the spray material; at least one auxiliary air nozzle attached to the head body and jetting auxiliary air; an air cap attached to the head body and guiding the jetted auxiliary air from the auxiliary air nozzle to the melting area; and the spray direction of the spray material being substantially the same as the direction of the jetted main air.

In the arc spraying torch head, head body may be attached to a tip of a stem of an axially extending arc spraying torch such that the jet direction of the main air is tilted at a desired angle with respect to an axis of the stem. The arc spraying torch head may further comprise a cover attached to the front end of the head body, and the air cap may be mounted on the front end of the cover. In this case, the air cap may include an annular outer plate, an annular inner plate placed concentrically with the outer plate and an air passage defined between the outer plate and the inner plate, and one end of the air passage opening toward the auxiliary air nozzle and the other end of the air passage opening around the melting area.

Further, the arc spraying torch head as set forth above the head body may includes a feed mechanism that has a pair of feed rollers that hold therebetween and feed out the spray material guided by the spray material guides, and a motor for rotating one of the pair of feed rollers. Guide tubes for guiding the spray material may be connected to the head body, the guide tubes being led out of the stem from a rear portion of the head body.

BEST MODE FOR CARRYING OUT THE INVENTION

Now, embodiments of an arc spraying torch head according to the invention will be described in detail with reference to the drawings.

Figure 1:
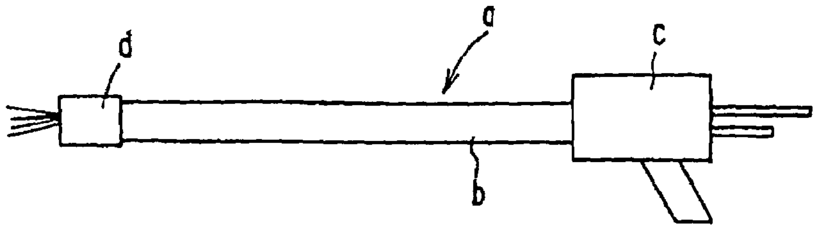
FIG. 1 is a schematic view of a conventional spraying torch having a long stem.
Figure 2:
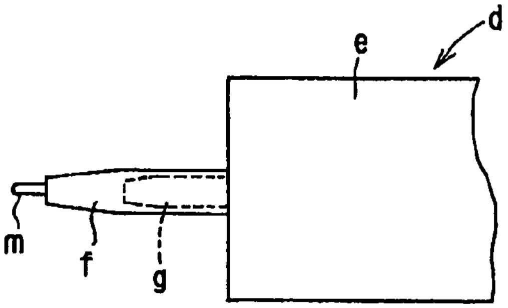
FIG. 2 is an enlarged schematic side view of a tip of a conventional arc spraying torch head.
Figure 3:
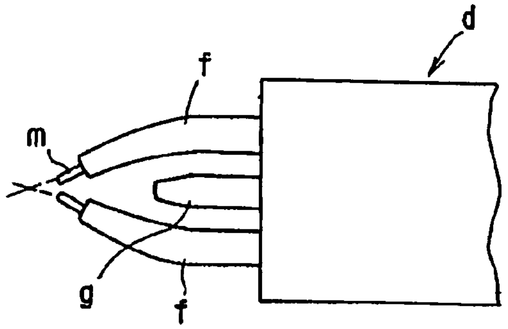
FIG. 3 is a schematic plan view of the arc spraying torch head in FIG. 2.
Figure 4:
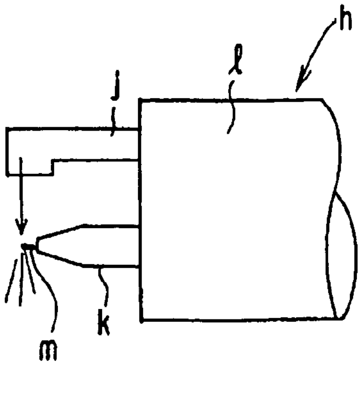
FIG. 4 is a schematic side view of another example of a conventional arc spraying torch head.
Figure 5:
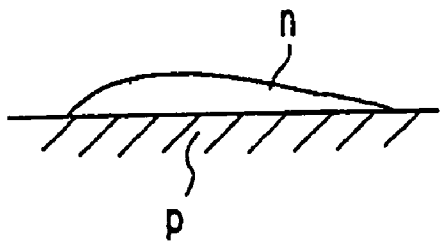
FIG. 5 illustrates a state of a film of a spray material when a spraying processing is performed by the arc spraying torch having the head shown in FIG. 4.
Figure 6:
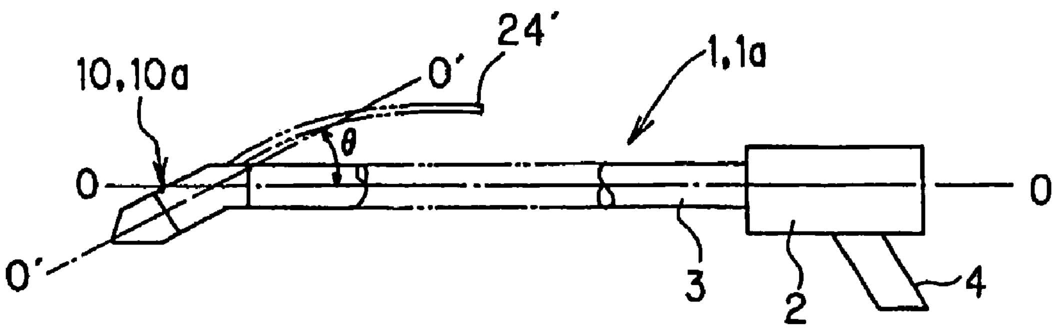
FIG. 6 is a schematic view of an arc spraying torch having a head according to the invention.
Figure 7:
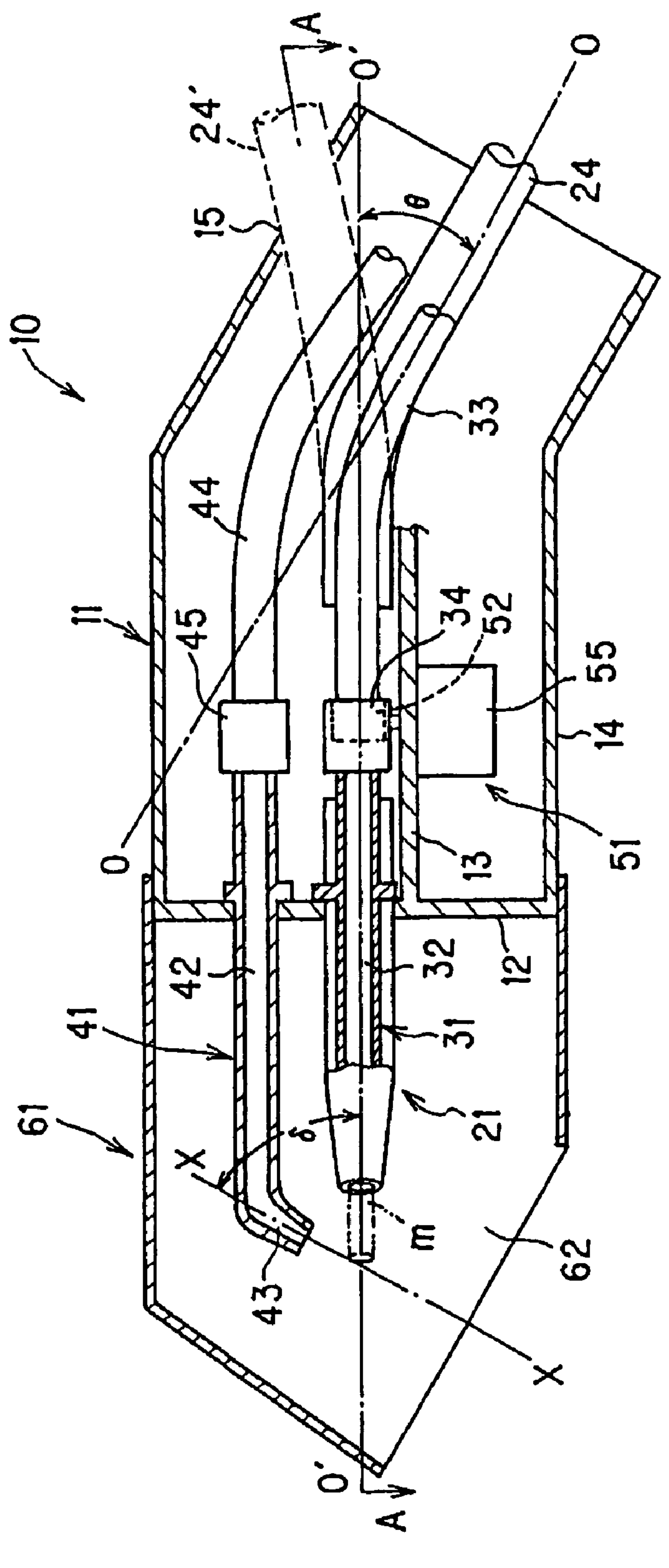
FIG. 7 is an enlarged sectional view of the head of the arc spraying torch in FIG. 6.
Figure 8:
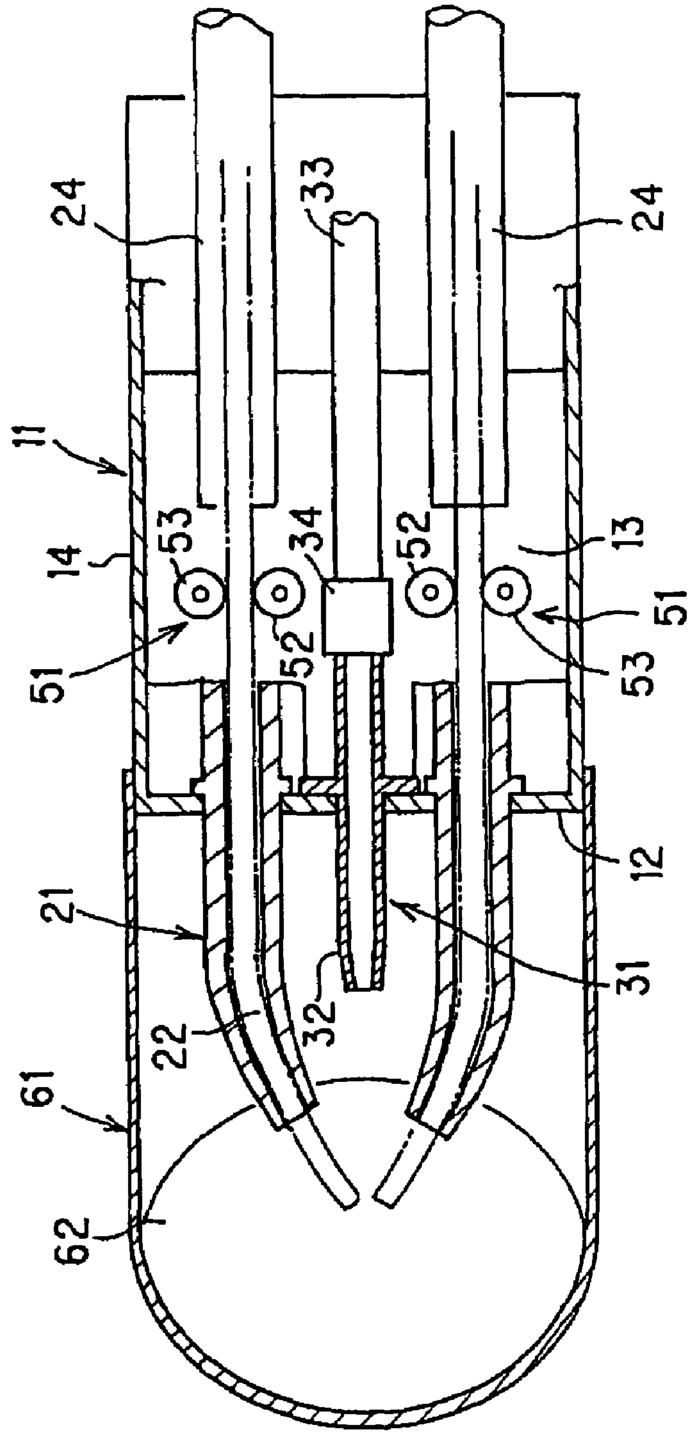
FIG. 8 is a sectional view taken along the line A-A in FIG. 7.

FIGS. 6 to 8 show an arc spraying torch 1 or 1*a* having a head 10 or 10*a* according to the embodiment. The arc spraying torch 1 or 1*a* includes an operation unit 2 that is held by a human hand to operate the spraying torch, a long stem 3 connected to the operation unit 2, and the head 10 or 10*a* attached to a tip of the stem 3. The operation unit 2 includes a handle 4 that is held by the hand, and devices such as a switch for operating the arc spraying torch. A cord for applying a voltage to the spray material and an air duct are introduced into the operation unit from a rear portion of the operation unit. An axis O'-O' of the head 10 or 10*a* is tilted at a desired angle θ with respect to an axis O-O of the stem. In this embodiment, the tilt angle θ of the head is about 35°, but any angle that facilitates spraying may be used in accordance with a shape of a subject to be sprayed to secure the stem and the head at the tilt angle.

The head 10 according to an embodiment has a head body 11 secured to the stem 3. The head body includes a front wall 12, a support 13 secured to the front wall 12, and a cylindrical housing 14 secured to the front wall 12 and the support 13. The head 10 further includes a pair of spray material guides 21 that is placed on the front wall 12 of the head body 11 with the axis O'-O' of the head therebetween and secured to the front wall by a known method, a main air nozzle 31 that is placed on the axis O'-O' and secured to the front wall by a known method, and an auxiliary air nozzle 41 that is placed in a plane substantially perpendicular to a plane including the axis and the pair of spraying guides and including the axis, and secured to the front wall 12 by a known method. A through hole 22 is formed in a center of each spray material guide 21, and a flexible bar-like or wire-like spray material is inserted and guided in the hole 22. The spray material guide 21 is secured to the front wall so as to protrude forward (leftward in FIG. 7) from the front wall 12. The spray material guide according to the embodiment has a curved tip, and is secured to the front wall such that a tip of the hole faces one point on the axis O'-O' as shown in FIG. 8. A rear end of the spray material guide 21 (a right end in FIGS. 7 and 8) is secured to the support 13 of the head body 11. For example, the rear end is aligned with a tip of a guide tube 24 made of synthetic resin such as Teflon (trademark), but separated from the tip. The guide tube 24 extends into the operation unit 2 through the stem 3. The spray material guide may be linear without the curved tip as shown, and secured to the front wall in a tilted manner. In this embodiment, the center of the main air nozzle 31 is aligned with the axis O'-O' of the head 10, but may be displaced from the axis. Also in this case, it is preferable that the main air nozzle is placed between the pair of spray material guides. Thus, in this case, the surface including the axis of the main air nozzle and the spray material guide is displaced from the axis. If an outer surface of the guide tube 24 made of synthetic resin of the spray material guide is protected by a heat resistant member such as a flexible tube, an opening 15 may be formed in the rear portion of the head body 11 to lead the guide tube out of the head 10 through the opening 15 as a guide tube 24' shown by dashed lines. The spray material guide 21 is preferably made of heat resisting and electrical insulating material. However, if the spray material guide is made of heat resisting metallic material, it should be electrically insulated with respect to the head body.

A through nozzle hole 32 is formed in a center of the main air nozzle 31. A tip of the nozzle hole 32 faces along the axis O'-O', and jets the main air on the axis. An air supply pipe 33 is connected to a rear end of the main air nozzle 31 via a connector 34. The air supply pipe 33 extends into the operation unit 2 through the stem 3, and connects to an open/close valve (not shown) provided in or out of the operation unit. A through nozzle hole 42 is formed in a center of the auxiliary air nozzle 41. A tip 43 of the nozzle hole 42 opens toward one point on the axis O'-O' of the head, and jets the auxiliary air on the point. This point is a substantially central point in an area where a pair of spray materials are molten by arc discharge as described below. An air supply pipe 44 is connected to a rear end of the auxiliary air nozzle 41 via a connector 45. The air supply pipe 44 extends into the operation unit 2 through the stem 3, and connects to a flow rate control valve with an open/close function (not shown) provided in or out of the operation unit. The open/close valve and the flow rate control valve are connected to an air supply not shown.

A main feed mechanism that feeds the wire-like spray material is provided in the operation unit 2, though not shown, but for more stable feeding of the spray material, an auxiliary feed mechanism 51 may be further provided in the head 10 as shown in FIGS. 7 and 8. The auxiliary feed mechanism has a pair of feed rollers 52, 53 rotatably supported by the support 13 immediately before an inlet of each spray material guide 21. One feed roller 52 is a drive roller that is rotated by a drive motor 55 mounted to the support 13, and the other feed roller 53 is an idler roller urged toward the feed roller 52. The pair of feed rollers 52, 53 hold the spray material m therebetween to feed the spray material to the spray material guide at a predetermined speed. The feed mechanism of the spray material may be provided only in the operation unit 2, or the feed mechanism may be provided only in the head with no feed mechanism in the operation unit. A power feed mechanism that applies a voltage to each spray material is also provided in the head, though not shown. A cover 61 that covers the spray material guide, the main air nozzle, and the auxiliary air nozzle is attached to a front of the head body (on a left side in FIG. 7). The cover 61 is formed with an opening 62 on a side where the spray material is jetted.

When the arc spraying torch 1 including the head 10 configured as described above is used for spraying, the head 10 is directed to a substrate surface to be sprayed, and the auxiliary nozzle of the head that brings the stem of the arc spraying torch substantially in parallel with the substrate surface is substantially aligned. Then, a voltage is applied to the pair of spray materials m for arc discharge between the tips thereof to melt the spray materials by an arc, jet the molten spray materials along the axis O-O by the main air from the main air nozzle 31, and jet the spray materials in a jet direction of the nozzle (along the line X-X) by the auxiliary air from the auxiliary air nozzle 41. Thus, the spray material is deposited on a surface to be deposited substantially perpendicular to the line X-X. Then, the jet direction of the spray material with respect to the line X-X can be changed by adjusting an amount of jet of the auxiliary air from the auxiliary air nozzle with respect to an amount of jet of the main air from the main air nozzle. The spray material is jetted by jet air from the main air nozzle and jet air from the auxiliary air nozzle, thus increasing a speed of particles of the molten spray material, increasing adhesion of the spray material to the substrate, that is, a surface treated material, increasing bonding between the particles, and further, reducing porosity in a film to increase density, thus allowing a film having high quality, erosion resistance, and wear resistance to be formed.

If the line X-X is tilted at $\delta$ with respect to the axis O'-O', the line X-X is tilted at $\theta+\delta$ with respect to the axis O-O of the stem 2, and a uniform spray film can be formed even when the spray material is deposited on a narrow and deep surface with a long stem.

Figure 9:
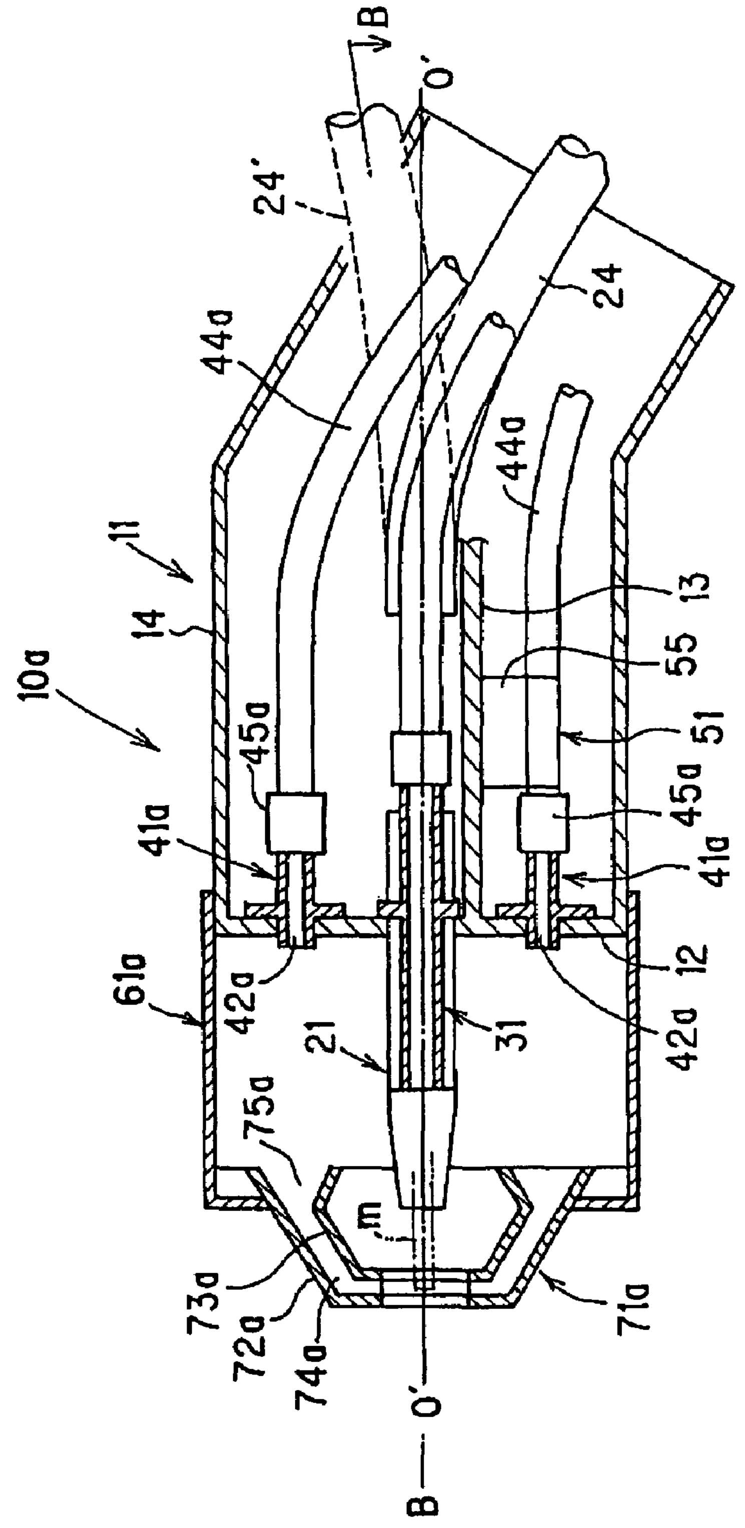
FIG. 9 is a sectional view of another embodiment of the head according to the invention.
Figure 10:
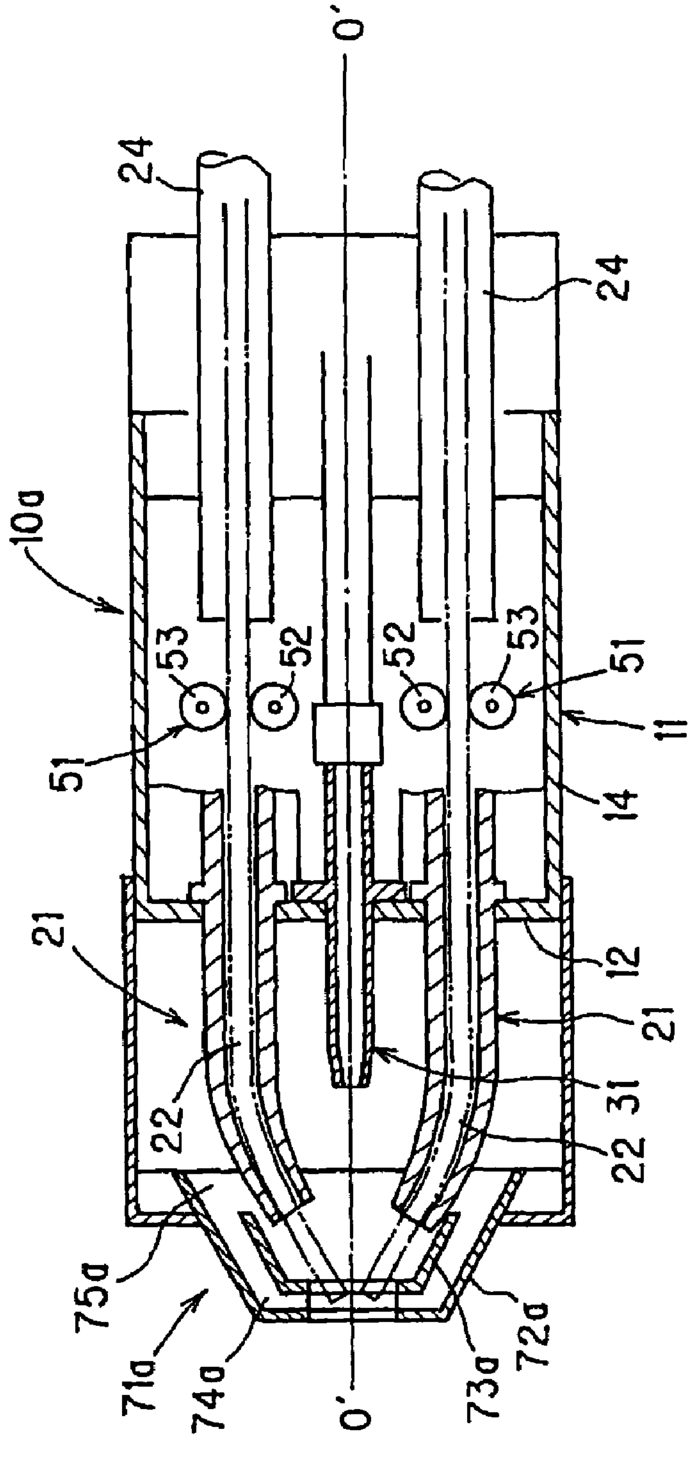
FIG. 10 is a sectional view taken along the line B-B in FIG. 9.

FIGS. 9 and 10 show another embodiment of an arc spraying torch head according to the invention denoted by 10*a*. A head body 11, a spray material guide 21, a main air nozzle 31, and an auxiliary feed mechanism 51 have the same structures and functions as the above described embodiment, and are thus denoted by the same reference numerals, and descriptions thereof will be omitted. Of course, as the above described embodiment, the spray material guide 21 may be led out of the head body from a rear portion of the head body, an auxiliary feed mechanism may be omitted, or a main feed mechanism in an operation unit may be omitted and replaced by an auxiliary feed mechanism provided in the head.

The arc spraying torch head 10*a* according to the embodiment has a pair of auxiliary air nozzles 41*a* attached to a front wall 12 separately above and below the main air nozzle 31. The auxiliary air nozzles do not protrude forward as shown, but nozzle holes 42*a* open straight forward along an axis O'-O'. An air supply pipe 44*a* is connected to a rear end of each auxiliary air nozzle 41*a* via a connector 45*a*. The air supply pipe 44*a* extends into an operation unit 2 through a stem 3, and connects to a flow rate control valve with an open/close function provided in or out of the operation unit. The open/close valve and the flow rate control valve are connected to an air supply not shown.

The arc spraying torch head 10*a* according to the embodiment includes an air cap 71*a* attached to a front end (a left end in FIG. 9) of a cover 61*a* attached to a front (on a left side in FIG. 9) of the head body. The air cap 71*a* includes an annular outer plate 72*a* and an annular inner plate 73*a* placed concentrically with the outer plate to define an annular air passage 74*a* therebetween. The outer plate 72*a* is secured to the cover 61*a* concentrically with an axis of the main air nozzle 31, namely, in this embodiment, the axis O'-O' of the head, and the inner plate 73*a* is secured to the outer plate via a plurality of partition members (not shown). An inner side end 75*a* of the air passage 74*a* is divergent (spreading toward the auxiliary air nozzle) so as to effectively introduce jet air from the auxiliary air nozzle. The air passage 74*a* is divided into a passage for the upper (in FIG. 9) auxiliary air nozzle and a passage for the lower auxiliary air nozzle by the partition member, thus allowing jetting on a melting area of a spray material from radial both sides around the axis O'-O'. The outer plate 72*a* and the inner plate 73*a* are, preferably, made of heat resisting material.

When the arc spraying torch 1*a* including the head 10*a* configured as described above is used for spraying, a voltage is applied to spray materials m for arc discharge between tips thereof to melt the spray materials by an arc, and jet the molten spray materials along the axis O'-O' by the main air from the main air nozzle 31, which is the same as the above described embodiment. However, in this embodiment, the auxiliary air jetted from the auxiliary air nozzle 41*a* is jetted substantially perpendicularly to the jet direction of the main air by the action of the air cap 71*a*. Thus, the molten spray material is blown off in the jet direction of the main air in this embodiment, but a jet angle of the spray material can be adjusted by adjusting an amount of jet from the radial both directions. The spray material is jetted by jet air from the main air nozzle and jet air from the auxiliary air nozzle, thus increasing a speed of particles of the molten spray material, increasing adhesion of the spray material to the substrate, that is, a surface treated material, increasing bonding between the particles, and further, reducing porosity in a film to increase density, and allowing a film having high quality, erosion resistance, and wear resistance to be formed.

Technical Advantages

The invention provides the following advantages.

(a) The jet direction of the spray material can be changed by adjusting the flow rate of the auxiliary air from the auxiliary air nozzle, thus allowing spraying on a narrow and deep spot.

(b) The particles of the spray material can be finer, and the spray material can be jetted on the substrate surface as a surface to be sprayed at high speed by jetting the main air and the auxiliary air on the molten spray material, thus allowing reliable deposition of the spray material.

(c) The adhesion of the spray material to the substrate can be increased to increase the bonding between the particles.

(d) The porosity in the film can be reduced to increase the density, thus increasing quality of the film.

(e) A film having erosion resistance, wear resistance, or the like can be formed.

Although the present invention has been described above in detail with reference to the drawings, the foregoing description is for explanatory purposes and not intended to limit characteristics. It should be understood that the foregoing description merely illustrates and explains preferred embodiments, and all modifications and changes within the scope of the spirit of the present invention are protected.

The entire disclosure of Japanese Patent Application No. 2002-122575 filed on Apr. 24, 2002 including specification, claims, drawings and summary is incorporated herein by reference in its entirety.

The invention claimed is:

1. An arc spraying torch head comprising:

a pair of spray material guides attached to a head body so as to face forward and guiding a flexible wire-like spray material inserted therein;

a main air nozzle attached to said head body between said pair of spray material guides, and jetting main air toward a melting area of said spray material;

an auxiliary air nozzle jetting auxiliary air toward said melting area;

the direction of jetted auxiliary air by said auxiliary air nozzle tilted with respect to the direction of jetted main air by said main air nozzle, said auxiliary air being jetted toward said melting area;

a flow rate control valve with an open/close function being provided between said auxiliary air nozzle and an air supply; and the spray direction of said spray material being inclined with respect to the direction of said jetted main air and an amount of jet of said auxiliary air being adjusted, to thereby change the spray direction of said spray material.

2. The arc spraying torch head according to claim 1, wherein said head body is attached to a tip of a stem of an axially extending arc spraying torch such that the direction of said jetted main air is tilted at a desired angle with respect to an axis of said stem.

3. The arc spraying torch head according to claim 1, wherein said pair of spray material guides, the main air nozzle, and the auxiliary air nozzle are attached to a front wall of said head body so as to protrude forward, wherein at least an outlet of said pair of spray material guides is tilted with respect to the direction of said jetted main air, and wherein said spray material guides, the main air nozzle, and the auxiliary air nozzle are covered with a cover that opens only in the spray direction of said spray material.

4. An arc spraying torch head comprising:

a pair of spray material guides attached to a head body so as to face forward and guiding a flexible wire-like spray material inserted therein;

a main air nozzle attached to said head body between said pair of spray material guides, and jetting main air toward a melting area of said spray material;

a pair of auxiliary air nozzles attached to said head body and jetting auxiliary air;

an air cap attached to said head body and defining air passages that guide said jetted auxiliary air from said auxiliary air nozzle to said melting area;

flow rate control valves with an open/close function being provided between each of said auxiliary air nozzle and an air supply; and the spray direction of said spray material being substantially the same as the direction of said jetted main air;

wherein the spray direction of said spray material is adjusted by adjusting an amount of said auxiliary air from the radial both directions.

5. The arc spraying torch head according to claim 4, wherein said head body is attached to a tip of a stem of an axially extending arc spraying torch such that the jet direction of said main air is tilted at a desired angle with respect to an axis of said stem.

6. The arc spraying torch head according to claim 1 or 4, wherein said head body includes a feed mechanism that has a pair of feed rollers that hold therebetween and feed out the spray material guided by said spray material guides, and a motor for rotating one of said pair of feed rollers.

7. A turbine runner having a surface on which molten spray material is deposited by being blown by use of the arc spraying torch head according to claim 1 or claim 4.

* * * * *